(12) United States Patent
Gupta et al.

(10) Patent No.: US 10,706,065 B2
(45) Date of Patent: Jul. 7, 2020

(54) OPTIMIZING TRANSFORMATION OF DATA

(71) Applicant: SAP SE, Walldorf (DE)

(72) Inventors: Yadesh Gupta, Gurgaon (IN); Sudhir Verma, Gurgaon (IN)

(73) Assignee: SAP SE, Walldorf (DE)

( * ) Notice: Subject to any disclaimer, the term of this patent is extended or adjusted under 35 U.S.C. 154(b) by 768 days.

(21) Appl. No.: 15/090,624

(22) Filed: Apr. 5, 2016

(65) Prior Publication Data

US 2017/0286508 A1 Oct. 5, 2017

(51) Int. Cl.
| G06F 17/30 | (2006.01) |
| G06F 16/25 | (2019.01) |
| G06F 9/50 | (2006.01) |

(52) U.S. Cl.
CPC .............. *G06F 16/258* (2019.01); *G06F 9/50* (2013.01)

(58) Field of Classification Search
CPC ....... G06F 9/4881; G06F 3/126; G06F 9/5038
See application file for complete search history.

(56) References Cited

U.S. PATENT DOCUMENTS

| 6,237,058 | B1 * | 5/2001 | Nakagawa | ............... | G06F 13/24 710/260 |
| 2005/0262192 | A1 * | 11/2005 | Mamou | ............. | G06F 17/30563 709/203 |
| 2006/0288346 | A1 * | 12/2006 | Santos | ................... | G06F 9/4887 718/102 |
| 2009/0287703 | A1 * | 11/2009 | Furuya | ............... | G06F 17/30353 |
| 2011/0246998 | A1 * | 10/2011 | Vaidya | ................... | G06F 9/4881 718/103 |
| 2014/0282572 | A1 * | 9/2014 | Kang | ..................... | G06F 9/4881 718/103 |
| 2015/0006589 | A1 * | 1/2015 | Hagenbuch | ........... | G06F 9/5083 707/803 |
| 2015/0278656 | A1 * | 10/2015 | Mitsumori | ............ | G06F 3/1211 358/1.15 |
| 2016/0041543 | A1 * | 2/2016 | Monczynski | ...... | G05B 19/0428 700/97 |
| 2017/0277568 | A1 * | 9/2017 | Lu | ......................... | G06F 9/5027 |

\* cited by examiner

*Primary Examiner* — Usmaan Saeed
*Assistant Examiner* — William P Bartlett
(74) *Attorney, Agent, or Firm* — Buckley, Maschoff & Talwalkar LLC

(57) ABSTRACT

Methods and system are disclosed that generate an execution schedule to optimize a transformation of business. In one aspect, from multiple tables residing in multiple databases and storing business data associate with multiple business management systems, dependencies between the tables may be determined based on attributes associated with the tables. When execution time for transforming business data exists, a decrease time algorithm or a critical path algorithm may be executed to generate execution schedule and to calculate processor idle times during the transformation of business data. Based on the calculated processor idle times, whether or not to execute a local optimization algorithm may be determined. Based on the determination, execution schedule that optimize the transformation of business data may be generated. The transformation of business data may be executed based to the generated execution schedule that optimizes a time consumed for transforming the business data in the tables.

17 Claims, 10 Drawing Sheets

| TABLE | TIME REQUIRED (HOURS) | TABLE PRECEDENCE DEPENDENCY | SEQUENCE NUMBER |
|---|---|---|---|
| A | 9 | | 1 |
| B | 7 | | 1 |
| C | 8 | | 1 |
| D | 5 | | 1 |
| E | 10 | A,B | 2 |
| F | 4 | B | 2 |
| G | 3 | C | 2 |
| H | 6 | F,G | 3 |
| I | 3 | E | 4 |
| J | 8 | E,H | 4 |

FIG. 3

OPTIMIZING TRANSFORMATION OF DATA

BACKGROUND

Enterprise data may be scattered and stored in different formats, when accessed by different systems and applications (e.g., fragmented infrastructure) in an enterprise. An end user may experience latency and inconsistency when such enterprise data is consumed. For example, when enterprise data is consumed via fragmented infrastructure, it adds to overheads of integrating systems and applications, resulting in undesirable user experiences, limited personalization of content, inefficient user management and access control rights, inefficient content management techniques, etc. An infrastructure that unifies or converts the enterprise data, such that an overall experience may be improved when the user consumes the enterprise data, may be provided. However, unifying or converting the enterprise data may include overheads in terms of cost and operations including hiring professionals with expertise in designing solutions for converting or modeling the enterprise data, implementing the designed solutions, monitoring the execution of conversion of enterprise data, etc. Therefore, optimally transforming the enterprise data to reduce or minimize the overall cost and time for transforming the enterprise data, may be challenging.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 3 is a table illustrating execution time for executing transformation of business data in tables, according to an embodiment.

DETAILED DESCRIPTION

Figure 1:
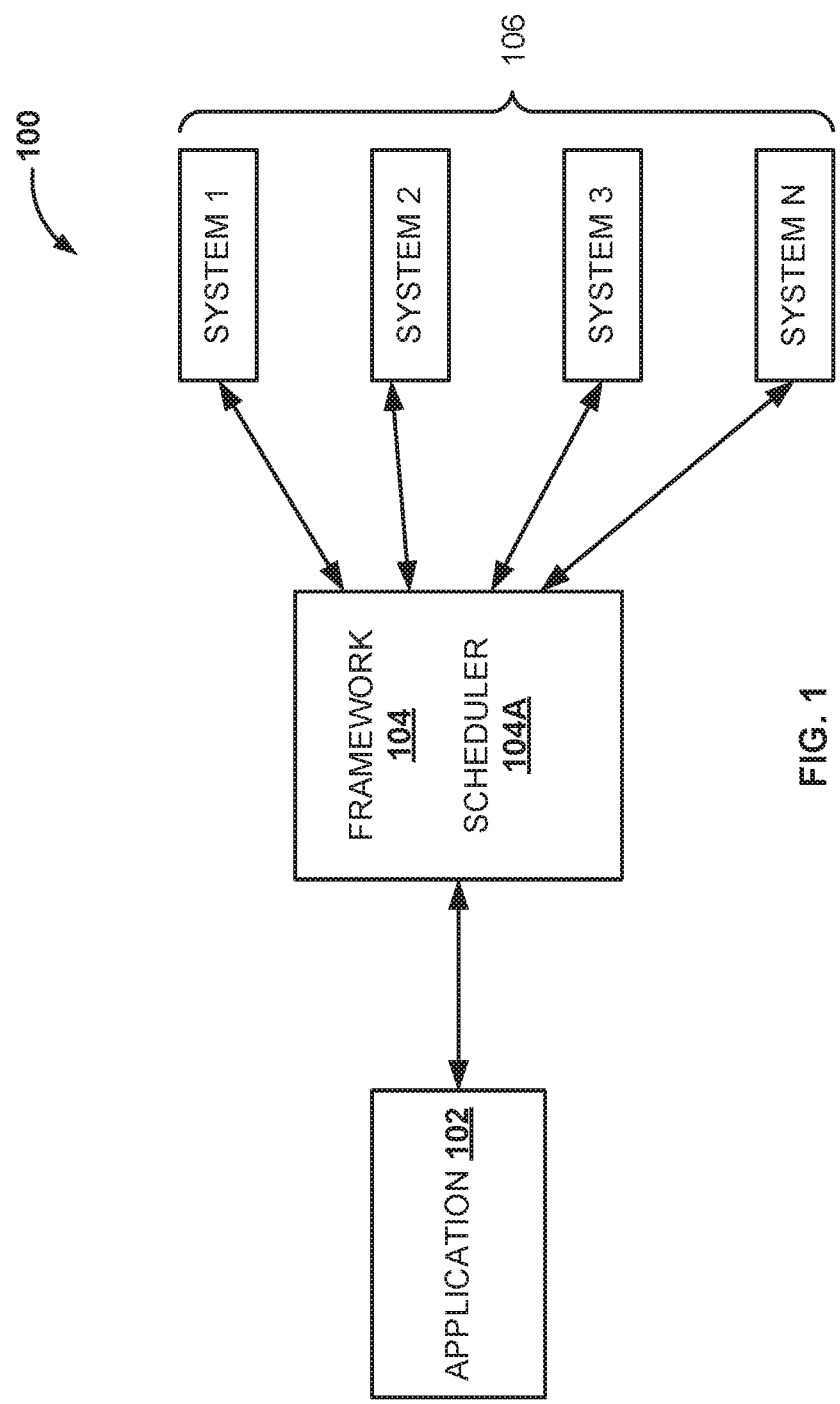
FIG. 1 is a block diagram illustrating environment to generate a time schedule for optimizing transformation of business data, according to an embodiment.

Embodiments of techniques related to optimizing transformation of data are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Business data in an enterprise may be accessed and modified by multiple systems and applications and stored in geographically distributed data repositories (e.g., data stores, databases, etc.). The multiple systems and applications accessing such business data may be deployed on different platforms (e.g., on-premise environment, cloud computing environment, etc.). In an embodiment, the business data may be modified (e.g., altered, added, deleted, edited, etc.) by conversion or business data unification. To optimize the mechanism for conversion or unification of the business data, the enterprise may provide a framework that may communicate with the different systems (e.g., business management systems) and applications in the enterprise, to convert or unify (e.g., convert or model) the business data.

In an embodiment, such a framework may provide a platform that may include an application (e.g., data provisioning application) communicatively coupled with multiple business management systems (e.g., Partner Relationship management (PRM), Enterprise Resource Planning (ERP), Customer Relationship Management (CRM), Service Mobile Platform (SMP), Ramp-up Knowledge Transfer (RKT), Learning Solutions (LSO), etc.). In an embodiment, a business management system may include an integration of applications (e.g., with specific functionalities) for facilitating and managing business activities in an organization. In an embodiment, the framework may facilitate execution of operations such as retrieving the business data from the multiple business management systems, triggering data models, triggering models or routines for transforming the business data, etc.

In an embodiment, the framework may facilitate the execution of the above operations by executing routines and via software components. In an embodiment, a software component may correspond to set of instructions or program code that may be reused based on definition and implementation. For example, the software components may instantiate execution of algorithms for executing operations like transforming business data for conforming or modeling to specific data models (e.g., user defined data models or standard data models), optimize execution of operations, etc. In an embodiment, routines may correspond to a set of instructions executed by processors to provide specific functionalities. Optimization may correspond to finding an optimum execution schedule (e.g., appropriate processing start time, end time, etc., for a given set of operating environment or operating conditions) subject to constraints.

FIG. 1 is a block diagram illustrating environment 100 to generate a time schedule for optimizing transformation of business data, according to an embodiment. In an embodiment, FIG. 1 shows application 102 (e.g., data provisioning application) in communication with framework 104. The framework 104 may be in communication with multiple business management systems 106 (e.g., databases associated with the business management systems that may be deployed on-premise, cloud computing environments, analytics system and databases (row wise, column wise, etc.)).

In an embodiment, framework 104 may include an integration of multiple systems (e.g., computing systems executing specific tasks or operations), multiple routines and algorithms (e.g., sequence of program instructions executed by multiple processors in multiple systems), operational engines, data models, software components, etc. The integration of multiple routines, software components, etc., may facilitate executing specific functions or tasks. The framework 104 may run routines for executing operations like triggering data models, retrieving business data from the multiple business management systems (e.g., 106) using data services, retrieving the business data from the multiple business management systems (e.g., 106), transforming business data based on system landscape transformation models, etc.

In an embodiment, the business data may be stored in data structures (e.g., tables, flat files, etc.) in databases associated with multiple business management systems 106. Based on attributes associated with the tables in the database, dependencies between the tables may be determined. In an embodiment, the databases may also include historical information, such as historical execution time for transforming business data. In an embodiment, framework 104 may trigger transformation of business data based on system landscape transformation models. For transforming the business data, a scheduler (e.g., deployed as a software component) integrated in the framework, may schedule an execution of transformation of business data. Prior to scheduling the transformation, a business logic executing as a routine in framework 104, may generate execution schedule that may optimize the transformation of business data. In an embodiment, to generate execution schedule that may optimize the transformation of business data, various optimization algorithms may be executed. For example, the optimization algorithms may use the historical execution time or estimated execution time for transforming the business data in the tables and generate an optimum execution schedule, calculate processor idle times during the transformation of business data, determine whether to rearrange the transformation of business data in the tables between the processors, etc.

In an embodiment, processor idle times may correspond to times when the processor is not being used by specific programs or tasks (or any associated operation or process). A routine (e.g., program or task) or software component that runs in framework 104 may occupy certain amount of processing time on the processor, when the processor is executing the program or task. The processor idle time may be minimized and overall time consumed for transforming the business data may be optimized as a result. In an embodiment, upon calculating the processor idle times, the business logic associated with optimizing algorithms may determine whether to execute a local optimization algorithm. Based on such determination, execution schedule for transforming the business data may be generated. The generated execution schedule may be executed by scheduler 104A which may optimize the transformation of business data.

Figure 2:
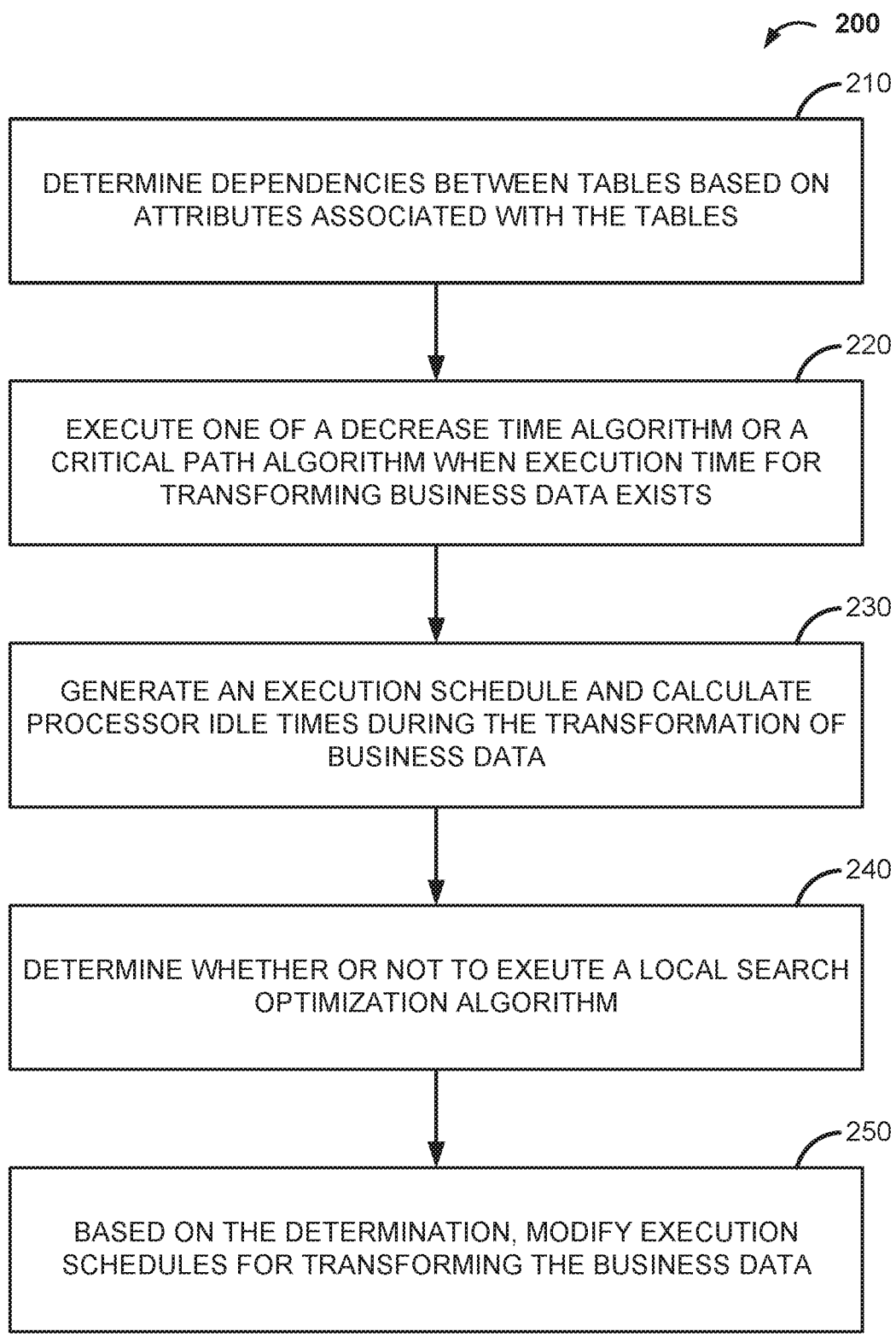
FIG. 2 is a flow diagram illustrating process to generate an execution schedule for optimizing transformation of business data, according to an embodiment.

FIG. 2 is a flow diagram illustrating process 200 to generate an execution schedule for optimizing transformation of business data, according to an embodiment. In an embodiment, an execution schedule for optimizing transformation of business data may be generated. The business data may be associated with multiple business management systems and stored in multiple geographically distributed databases. The business data may be stored in different data structures (e.g., tables, flat files, etc.) and may include multiple attributes. In an embodiment, business data stored in the database tables may have multiple dependencies that may be identified or determined by the associated attributes. For example, such dependencies may include a foreign key relationship between columns of the tables, definitions of tables referencing other tables (e.g., when definition or attributes or metadata of Table A references to Table B, such a reference may correspond to Table A being dependent on Table B), etc.

In an embodiment, based on attributes associated with the table, dependencies between the tables are determined, at 210. In an embodiment, the multiple databases storing business data associated with different business management systems may be in communication with a framework and an application. The application may include an integration of user interface engines, user interface components, etc., and may facilitate consumption of the transformed business data through user interfaces. In an embodiment, the business data stored in the tables may be transformed by executing routines associated with the transformation of the business data. An historical execution time (e.g., historical information or historical data) for transforming the business data for the tables may be generated by executing test runs. The execution schedule may further be optimized by executing optimization algorithms. For example, execution of such optimization algorithms may generate execution schedule that may reduce an overall time consumed for the transformation of the business data.

In an embodiment, when the execution time for transforming the business data exists (e.g., are generated or provided), one of a decrease time algorithm or a critical path algorithm is executed, at 220. The determination of the algorithm to be executed may be based on a business logic. For example, the business logic for determining the algorithm (e.g. the decrease time algorithm or the critical path algorithm) to be executed may be based on historical information or data associated with estimated execution time for transforming the business data. As discussed previously, the estimated execution time may be generated by executing test runs for transforming the business data. In an embodiment, a test run may correspond to executing transformation of the business data under simulated or actual operating conditions (e.g., resources or infrastructure in the framework, such as systems, processors, etc.) to ascertain the reliability of transformation of the business data.

In an embodiment, an execution schedule is generated and processor idle times during the transformation of business data is calculated, at 230. The execution schedule including the processor idle times may be computed by the execution of the decrease time algorithm or critical path algorithm. In an embodiment, based on the calculated processor idle times and the generated execution schedule, whether or not to execute a local optimization algorithm is determined, at 240. Based on the determination, the execution schedule for transforming the business data are modified, at 250. The generated execution schedule (including modifications, if any) that may optimize the transformation of the business data is executed.

In an embodiment, when the execution time for transforming the business data does not exist or are unavailable, an estimation algorithm may be executed. The execution of the estimation algorithm may generate an estimated execution time for transforming the business data. For example, the historical execution time may be generated by executing transformation of the business data in test environment. Execution of the estimation algorithm on the business data in the test environment may be referred to as test runs and the generated execution time may represent historical information associated with the transformation of the business data. In an embodiment, the execution of the estimation algorithm may generate an estimated execution time based on real time system parameters and factors. For example, such real time system parameters and factors may include number of records or entries in the tables, execution of business data transformation routines on multiple processors in the framework, number of systems deployed in the framework, etc.

In an embodiment, when determined that the execution time for transforming the business data exists or are available, the decrease time algorithm may be executed. The execution of the decrease time algorithm may sort (e.g., descending order) the execution time and the dependencies between tables may be determined. The execution of the decrease time algorithm may generate an execution schedule including the processor idle times for the transformation of the business data such that the overall time consumed for transforming the business data is minimized or reduced.

In an embodiment, when it may be determined that the execution time for transforming the business data exists or are available, the critical path algorithm may be executed. Based on the dependencies between the tables, the execution of critical path algorithm may generate a graph including precedence for the tables. From the generated precedence graph, critical paths between the tables may be computed based on sorted order (e.g., descending order) of the execution time for transforming the business data. Based on the computed critical paths, a priority list including the execution schedule of transforming the business data may be generated. The priority list may include the order in which the tables (e.g., based on the execution time) are arranged for transforming the business data. In an embodiment, the processor idle times during the transformation of the business data (e.g., on the priority list including the estimated execution time) may be calculated in the generated schedule.

In an embodiment, the execution schedule including the processor idle times may be calculated after executing the decrease time algorithm or the critical path algorithm. Upon calculating the processor idle times, the business logic associated with optimizing algorithms may determine whether or not to execute the local optimization algorithm. When it may be determined that the local optimization algorithm is executed, the transformation of the business data in tables may be rearranged between the processors. In an embodiment, the rearrangement for transforming the business data in the tables, between the processors may be based on the calculated processor idle times and the dependencies between the tables. Based on such rearrangement, the execution schedules for executing the transformation of business data may be generated. The execution of the generated execution schedule by the scheduler may optimize the transformation of business data.

In an embodiment, to generate execution schedule that may optimally transform the business data, an objective function may be formulated and the objective function may either be minimized or maximized to converge to an optimal solution. For example, the optimal solution may correspond to generating execution schedule for optimally transforming the business data in the tables, such that the overall time consumed for transforming the business data is reduced or minimized. The execution schedule for transforming the business data may be generated by iteratively rearranging the transformation of the business data in the tables between the processors. In such a scenario, the execution of transformation of the business data by iteratively rearranging the tables between the processors may be optimized such that an overall time consumed for transforming the business data in the tables is reduced.

In an embodiment, to generate execution schedule that may optimize the transformation of business data, the objective function may be formulated as:

Objective function: Minimize $T$      Equation (1):

Equation (1) may generate the optimal solution for transforming the business data, such that the overall time consumed 'T' for transforming the business data is reduced. The overall time consumed 'T' for transforming the business data may be minimized by enforcing or subjecting Equation (1) to constraints.

In an embodiment, the constraints to be enforced may depend on real time system parameters and factors, such as number of systems (or machines) participating in the transformation, number of processors in each system, number of tables in which business data is stored are being transformed, etc. Based on the above factors, the constraints may be formulated into equations, as:

$$W = ceil\left(\frac{\max\{\Sigma_{i=1}^{N} p_{i,1}, \Sigma_{i=1}^{N} p_{i,2}, \ldots, \Sigma_{i=1}^{N} p_{i,M}\}}{t}\right) \quad \text{Equation (2)}$$

$$\forall_i, \Sigma_{j=1}^{M}\Sigma_{k=1}^{W} x_{i,j,k} = 1 \quad \text{Equation (3):}$$

$$(x_{1,j,k}*t*k) + (x_{1,j,k}*p_{1,j}) \le (x_{5,j,k}*t*k) \quad \text{Equation (4):}$$

$$\forall_j, G_j = \max\{((k*t*x_{1,j,1}) + (x_{1,j,1}*p_{1,j})), ((k*t*x_{1,j,2}) + (x_{1,j,2}*p_{1,j})), \ldots, ((k*t*x_{N,j,W}) + (x_{N,j,W}*p_{N,j}))\} \quad \text{Equation (5):}$$

$$T = \max\{G_1, G_2, \ldots, G_M\} \quad \text{Equation (6):}$$

In the above equations, 'i' represents index of tables; 'j' represents index of system/machine/processors in which business data may be transformed; 'k' represents the index of time-window; 'T' represents the total time consumed for transforming the business data; '$x_{i,j,k}$' represents a decision variable that can take a value '0' or '1' such that value '1' is assigned for table '$i^{th}$'; '$j^{th}$' assigned to machine in the '$k^{th}$' time window; 'N' represents the number of tables; 'M' represents the number of system/machines: 't' represents the system configurable time window/block (e.g., time with highest common factor for transforming data in the table can be considered); 'W' represents the number of time-windows as computed in Equation (5); '$p_{i,j}$' represents the time consumed or duration for processing a '$i^{th}$' table when scheduled to execute on '$j^{th}$' machine: '$G_j$' represents the last table being selected for the solution during optimization process.

Figure 4:
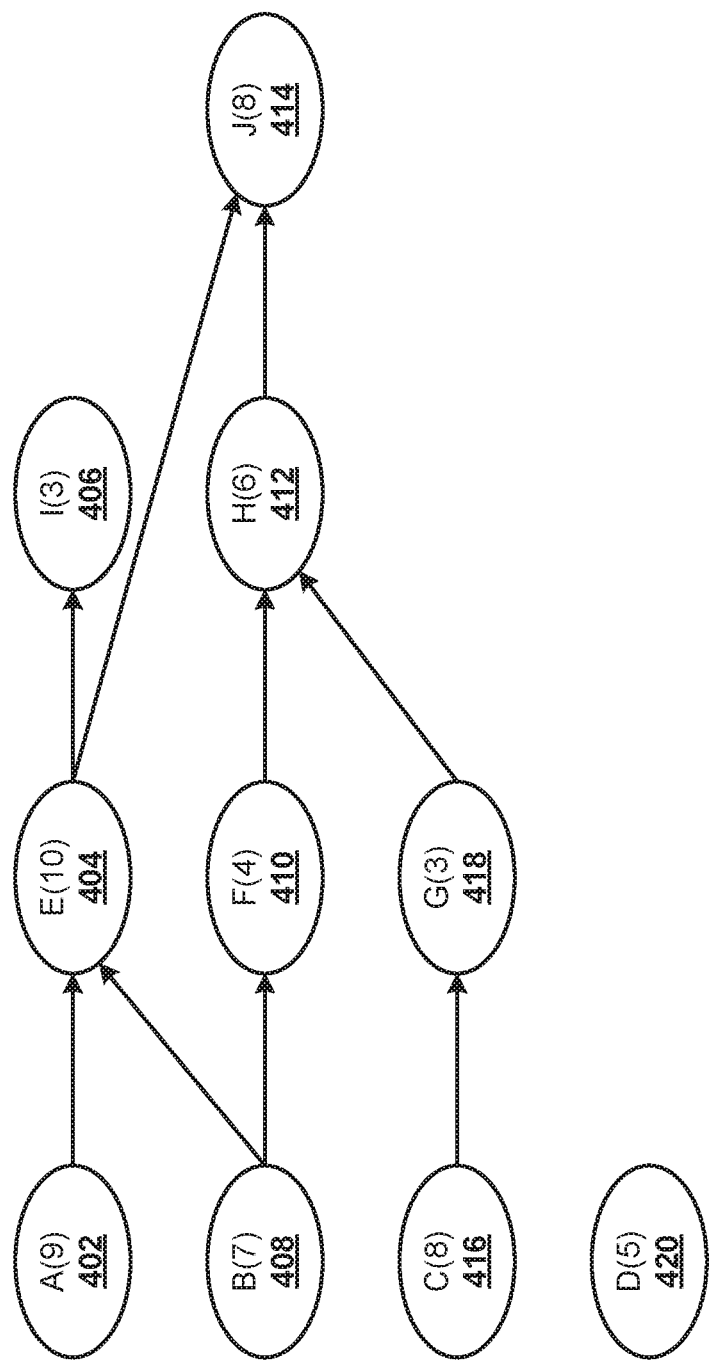
FIG. 4 is a block diagram illustrating dependencies between tables, according to an embodiment.

In an embodiment, Equation (2) may represent the calculation of total number of time-window which would be assigned for each processor prior to scheduling the table for execution. Equation (3) may represent a constraint such that the execution of transformation business data in each table is assigned or allocated to at most one processor. Equation (4) may represent the table dependency constraint, for example, the transformation of business data in Table E may executed after the transformation of business data in Table A (e.g., in FIG. 4, Table 'A' is assigned index 1 and Table 'E' is assigned index 5); all dependencies between the tables may be determined and constraints may be enforced (e.g., as shown in FIG. 4). Equation (5) may represent the last table, in which the business data was transformed on machine or processor. Equation (6) may represent the 'T' which is maximum value of end time across processor for the last task (e.g., transformation of business data in a table) assignment. The constraints (e.g., Equations (3), Equation (4), Equation (5) and (6)) enforced on the execution of transformation of business data (e.g., on tables, processors, etc.) are such that the total time consumed (e.g., overall time consumed) for transforming the business data is reduced and does not exceed 'T'.

FIG. 3 is a table illustrating execution time consumed for executing transformation of business data in tables, according to an embodiment. In an embodiment, FIG. 3 shows a table including historical or estimated execution time consumed (e.g., in hours) for executing transformation of the business data. The columns in the table, such as 'TABLE' 301 may correspond to the name of the table storing the business data. The column 'TIME REQUIRED' 302 may correspond to the time consumed by the table in transforming the business data therein. The column 'TABLE PRECEDENCE DEPENDENCY' 303 may correspond to the dependencies of tables on each other. The column 'SEQUENCE NUMBER' 304 may correspond to order in which the transformation of business data in the tables is executed. In an embodiment, the table in FIG. 3 may be generated by executing test runs in test environments for transforming the business data.

FIG. 4 is a block diagram illustrating dependencies between tables, according to an embodiment. In an embodiment, FIG. 4 shows the dependencies between the tables (e.g., Table A 402, Table E 404, Table I 406, Table B 408. Table F 410, Table H 412. Table J 414, Table C 416, Table G 418, Table D 420, etc.) and the historical or estimated execution time consumed (e.g., maximum time consumed, shown in brackets) for transforming the business data stored in the tables. The dependencies between the tables may be determined by attributes associated with the tables. The arrows indicate dependencies between the tables (e.g., Table E 404 may be dependent on Table A 402 and Table E 404 may be dependent on Table I 406 and so forth.) In an embodiment, the execution of transformation of the business data in each table may be scheduled between multiple processors by the scheduler.

In an embodiment, in test environment, upon determining the table precedence dependency and the sequence number associated with each table, the scheduler may schedule the execution of transformation of business data. In an embodiment, the transformation of business data in the tables may be scheduled between multiple processors in a random or ad-hoc based scheduling mechanism. In such random or ad-hoc based scheduling, the system resources and the processor may not be utilized efficiently. For example, when the execution of the transformation of business data is scheduled between multiple processors, one or more processors may have to wait until the other processors complete execution. In such a scenario, the idle time on the processors may be high, resulting in inefficient utilization of the resources. Therefore, random or ad-hoc based scheduling for transforming the business data may not be optimal and transforming the business data may be further optimized.

Figure 5:
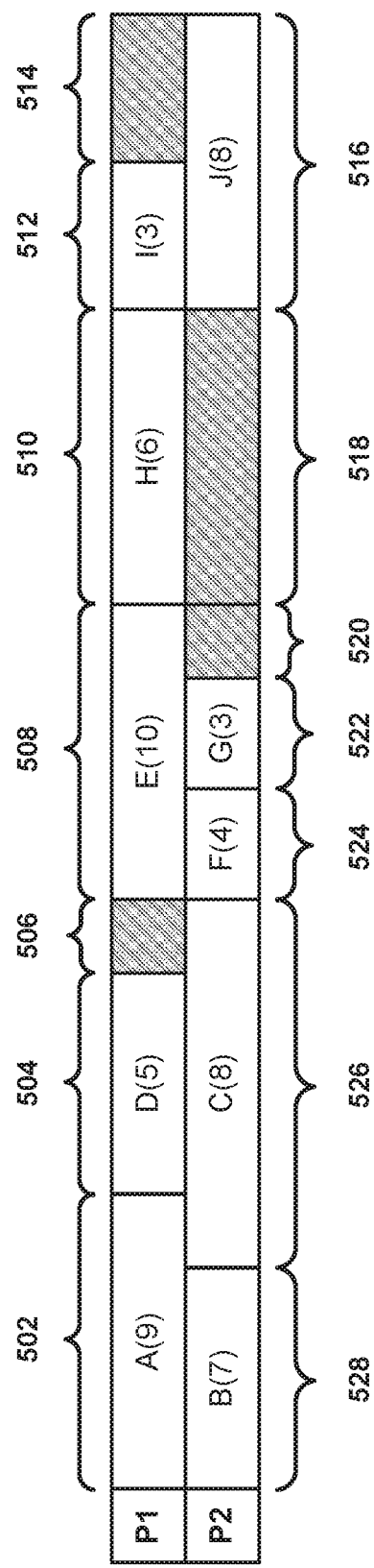
FIG. 5 is a block diagram illustrating scheduling of transformation of business data using random or ad-hoc mechanism with table dependency and sequence number based scheduling, according to an embodiment.

FIG. 5 is a block diagram illustrating scheduling of transformation of business data using random or ad-hoc scheduling mechanism with table dependency and sequence number, according to an embodiment. In an embodiment, when the transformation of business data in the tables (e.g., Table A 502, Table D 504, Table E 508, Table H 510, Table I 512, Table B 528, Table C 526, Table F 524, Table G 522. Table J 516, etc.) are scheduled randomly or ad-hoc based, the tables (e.g., Table A 502. Table B 528) that consume the maximum estimated execution time for transforming the business data is scheduled first to be executed by the processor (e.g., P1 and P2). Subsequently, based on descending order of the estimated execution time associated with the transformation, the remaining tables (e.g., Table D 504, Table E 508, Table H 510, Table I 512 by Processor P1; and Table C 526, Table F 524, Table G 522, Table J 516 by Processor P2) are scheduled to be executed by the processor. In an embodiment, FIG. 5 shows scheduling the transformation of business data for the table in FIG. 3 between 2 processors (e.g., P1 and P2). The processor idle time times are shown by shaded areas (e.g., 506, 514, 518, and 520) in FIG. 5. In an embodiment, the overall time consumed for transforming the business data in the tables may be computed to be equal to 39 hours, which may be further optimized by ignoring the sequence number from the existing and only considering the dependencies between tables (e.g., and the business data) shown in FIG. 4.

Figure 6:
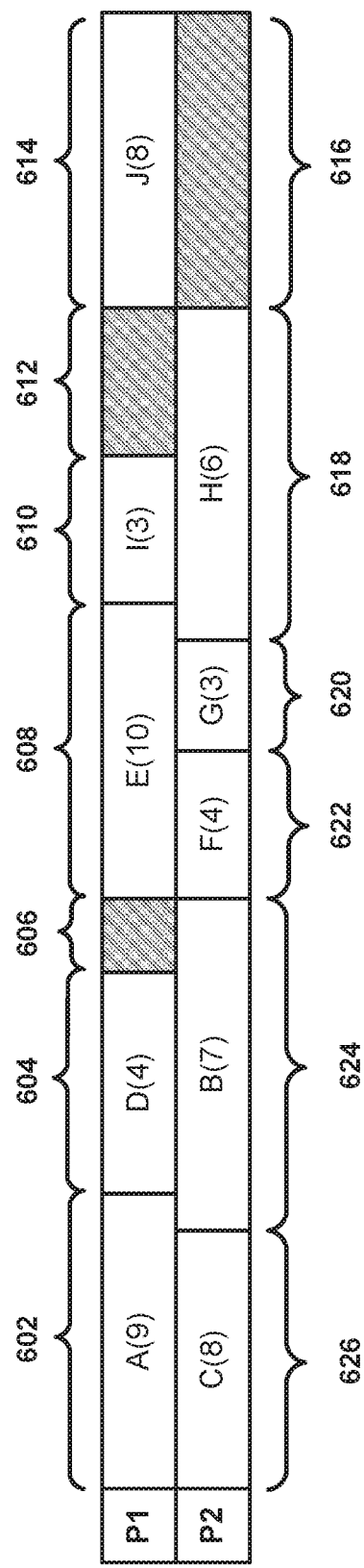
FIG. 6 is a block diagram illustrating scheduling of transformation of business data using random or ad-hoc with table dependency, according to an embodiment.

FIG. 6 is a block diagram illustrating scheduling of transformation of business data using random or ad-hoc with table dependency, according to an embodiment. In an embodiment, when the transformation of business data in the tables (e.g., Table A 602, Table D 604, Table E 608, Table I 610, Table J 614, Table H 618, Table G 620, Table F 622, Table B 624, Table C 626, etc.) are scheduled randomly or ad-hoc based using table dependencies and ignoring the sequence number, the tables (e.g., Table A 602, Table C 626) that consume the maximum estimated execution time for transforming the business data is scheduled first to be executed by the processor (e.g., P1 and P2). Subsequently, based on descending order of the estimated execution time associated with the transformation, the remaining tables (e.g., Table D 604. Table E 608, Table I 610, Table J 614 by Processor P1; and Table B 624, Table F 622, Table G 220, Table H 618 by Processor P2) are scheduled to be executed by the processor. In an embodiment, FIG. 6 shows scheduling the transformation of business data for the table in FIG. 3 & FIG. 4 between 2 processors (e.g., P1 and P2). The processor idle time times are shown by shaded areas (e.g., 606, 612 and 616) in FIG. 6. In an embodiment, the overall time consumed for transforming the business data in the tables may be computed to be equal to 36 hours, which may be further optimized by execution of optimization algorithms (e.g., decrease time algorithm, critical path algorithm, local optimization algorithm, etc.).

Decrease Time Algorithm

In an embodiment, the transformation of business data may be optimized by execution of decrease time algorithm using the table dependencies as shown in FIG. 4. The decrease time algorithm may be executed based on the historic or estimated execution time (e.g., determination of existence of estimated execution time) for transforming the business data. The execution of the decrease time algorithm may: sort the execution time in an order (e.g., descending order). Upon sorting the execution time in descending order, the execution of transformation of business data in the tables may be scheduled on the processors while preserving the table dependency.

Figure 7:
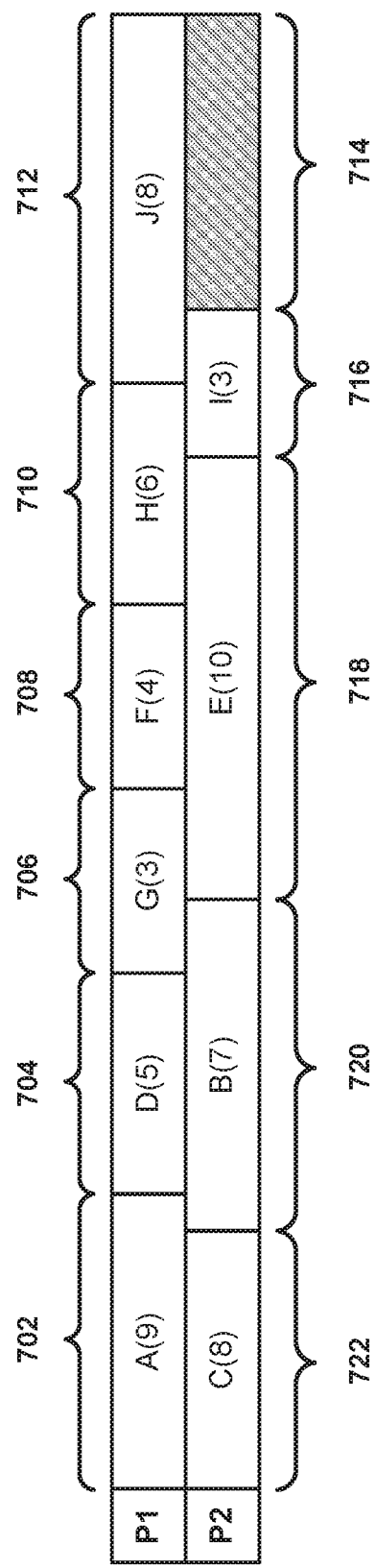
FIG. 7 is a block diagram illustrating optimizing transformation of business data when decrease time algorithm is executed preserving the table dependency, according to an embodiment.

FIG. 7 is a block diagram illustrating optimizing transformation of business data when decrease time algorithm is executed preserving the table dependency, according to an embodiment. In an embodiment, the execution of decrease time algorithm may sort the historic or estimated execution time in descending order. Upon enforcing table dependency FIG. 4, the execution of transformation of the business data in the tables may be scheduled by the processors. In an embodiment, FIG. 7 shows determining the scheduling of execution of transformation of the business data in the tables (e.g., Table A 702, Table D 704, Table G 706, Table F 708. Table H 710, Table J 712, Table I 716, Table E 718, Table B 720, and Table C 722) between 2 processors (e.g., P1 and P2). In an embodiment, the overall time consumed for transforming the business data in the tables (e.g., Table A 702, Table D 704, Table G 706, Table F 708, Table H 710, Table J 712, Table I 716, Table E 718, Table B 720, and Table C 722) may be computed to be equal to 35 hours. Based on the processor idle times (e.g., 714), the transformation of business data may be rearranged (e.g., Table E 608 and Table I 610 executed by processor 1 in FIG. 6 are rearranged to be executed by P2 in FIG. 7 also Table F 622, Table G 620 and Table H 618 executed by processor 2 are rearranged to be executed by P1 in FIG. 7) between the processors (e.g., P1 and P2), such that the overall time consumed for transforming the business data is reduced (e.g., the transformation of business data is optimized).

Critical Path Algorithm

In an embodiment, the transformation of business data may be optimized by the execution of critical path algorithm. Based on the dependencies between the tables including the business data, the execution of critical path algorithm may generate a precedence graph for the tables. Upon sorting the execution time in descending order, critical paths between the tables may be computed from the precedence graph. Based on the computed critical paths, a priority list including historic or estimated execution time for transforming the business data may be generated. The generated priority list generates an execution schedule and may be executed for optimizing the transformation of business data.

Figure 8:
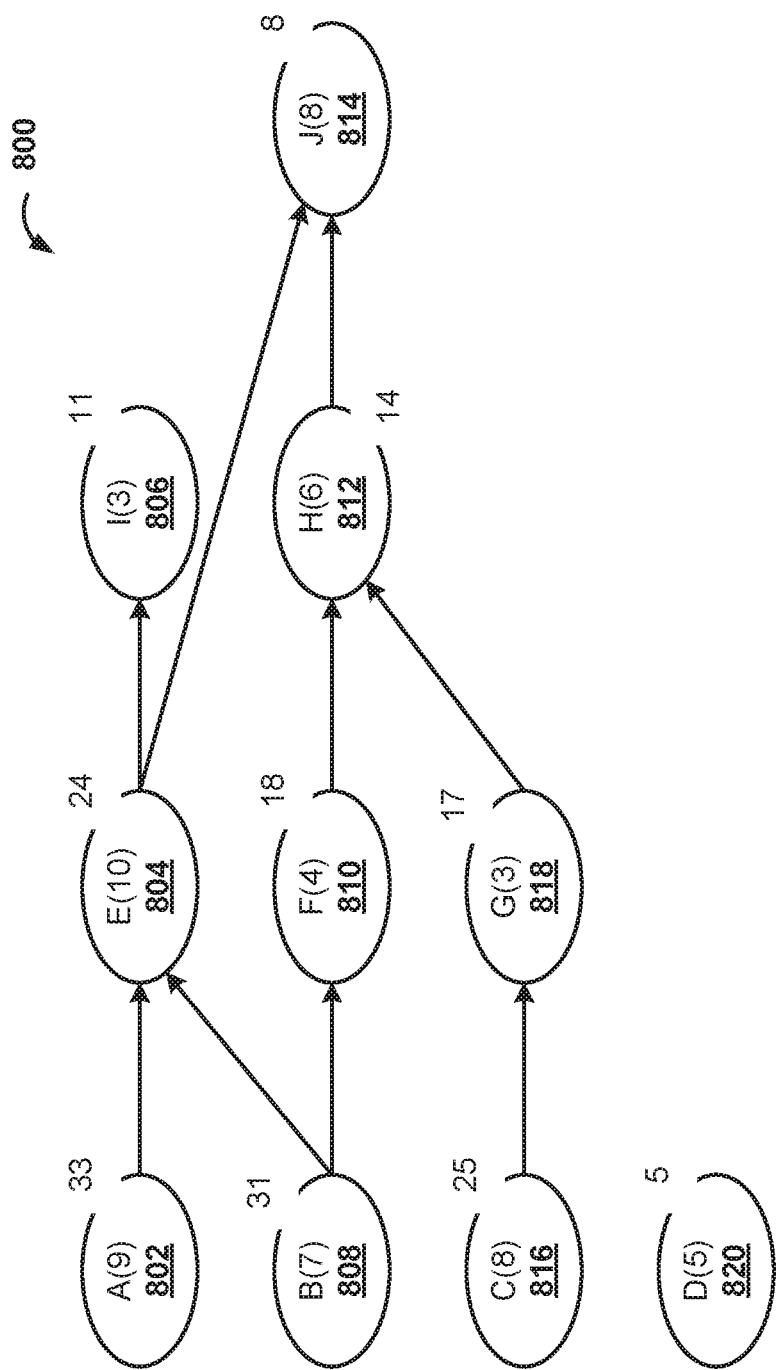
FIG. 8 is a block diagram showing a precedence graph generated by executing a critical path algorithm, according to an embodiment.

FIG. 8 is a block diagram showing a precedence graph 800 generated by executing a critical path algorithm, according to an embodiment. In an embodiment, the precedence graph 800 of FIG. 8 shows dependencies (e.g., indicate by arrows between tables Table A 802. Table E 804, Table I 806. Table B 808, Table F 810, Table H 812. Table J 814, Table C 816 and Table G 818) between the tables. As discussed previously, the critical paths between the tables may be computed based on the dependencies. Based on the computed critical paths, the priority list including the execution schedule may be generated and executed for optimizing the transformation of business data. As shown in FIG. 8, Table D 820 is not dependent on any of the tables.

Figure 9:
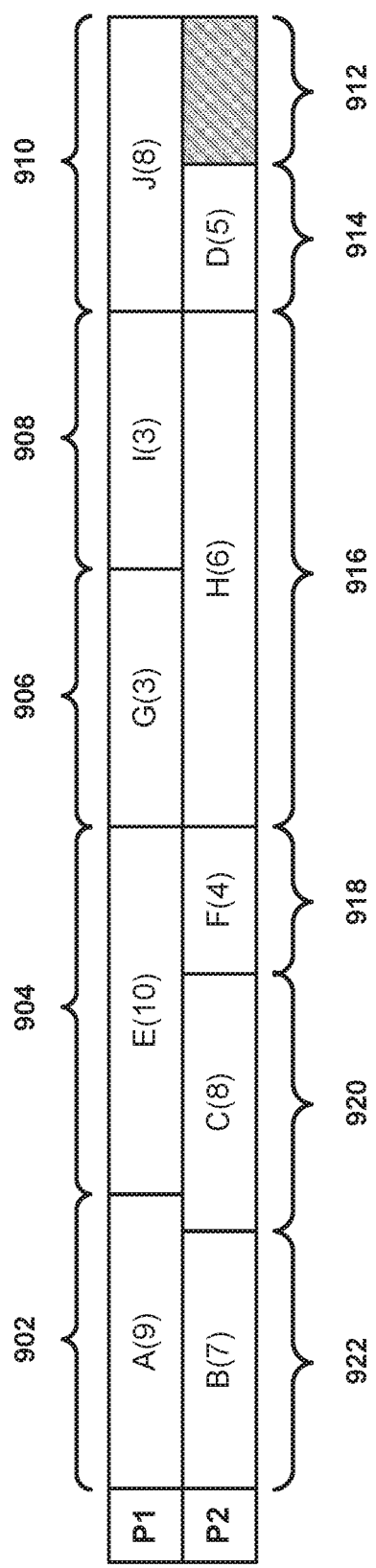
FIG. 9 is a block diagram showing optimizing transformation of business data when a critical path algorithm is executed, according to an embodiment.

FIG. 9 is a block diagram showing optimizing transformation of business data when a critical path algorithm is executed, according to an embodiment. In an embodiment, the table in FIG. 9 shows a rearrangement of tables (e.g., Table A 902, Table E 904, Table G 906, Table I 908, Table J 910, Table D 914, Table H 916, Table F 918, Table C 920, Table B 922) between the processors (P1 and P2), upon execution of critical path algorithm. In an embodiment, the overall time consumed for transforming the business data in the tables may be computed to be equal to 33 hours. Based on the processor idle times (e.g., 912), the transformation of business data may be rearranged (e.g., Table E 718 and Table I 716 of FIG. 7 are rearranged to be executed by P1 (904, 908) and Table F 708, Table H 712 and Table D 704 is rearranged to be executed in P2 (918, 916, 914)) between the processors (e.g., P1 and P2), such that the overall time consumed for transforming the business data is reduced (e.g., the transformation of business data is optimized).

Local Optimization Algorithm

In an embodiment, the transformation of business data may be optimized by the execution of the local optimization algorithm. The local optimization algorithm may be executed on the optimized execution schedule generated by executing the decrease time algorithm or the critical path algorithm. In an embodiment, the execution of the local optimization algorithm on the optimized execution schedule may determine the processor idle times; based on the determined processor idle times and the dependencies between the tables, the transformation of the business data in the tables may further be rearranged between the processors such that the overall time consumed for transforming the business data is reduced.

In an embodiment, the execution of local optimization algorithm may determine the processor consuming a highest time (e.g., by comparing with time consumed by other processors) for transforming the business data. The local optimization algorithm may rearrange the transformation of the business data in the tables between the processors such that the overall time consumed for transforming the business data is reduced. For example, the execution of the local optimization algorithm may determine the table that may take the least time for transforming the business data and rearrange (e.g., reallocate or swap) with tables consuming time greater than the least time between the processors. Such rearrangement or allocation of the tables between the processors may optimize the transformation by reducing the overall time consumed for transforming the business data considering the dependencies between the tables.

In an embodiment, an equation satisfying the above conditions may be formulated as:

$$p_{E,P1} + \sum_{i=1}^{N}\sum_{k=1}^{W} x_{i,P2,k} * p_{i,P2} < \sum_{i=1}^{N}\sum_{k=1}^{W} x_{i,P1,k} * p_{i,P1} \quad \text{Equation (7):}$$

In the above equations for the example of rearrangement (reallocation) of the Table E execution from P1 processor to P2 processor is validated; $p_{E,P1}$ represents the processing time for Table E on P1 processor; '$x_{i,P2,k}$' represents '$i^{th}$' Table decision variable assigned to P2 processor in the '$k^{th}$' time window; $p_{i,P2}$ represents the execution of time of '$i^{th}$' table in P2 processor; $x_{i,P1,k}$ represents $i^{th}$ table decision variable assigned to P1 processor in $k^h$ time window; $p_{i,P1}$ represents the execution time of '$i^{th}$' table on P1 processor.

In an embodiment, the execution of local optimization algorithm may determine the processor consuming a highest time (e.g., by comparing with time consumed by other processors) for transforming the business data. The local optimization algorithm may rearrange the transformation of the business data in the tables between the processors such that the overall time consumed for transforming the business data is reduced. For example, the execution of the local optimization algorithm may determine the table that may take the least time for transforming the business data and rearrange (e.g., swap) with tables consuming time greater than the least time between the processors. Such rearrangement or swap of the tables between the processors may optimize the transformation by reducing the overall time consumed for transforming the business data while obeying the table dependency.

In an embodiment, an equation satisfying the above conditions may be formulated as:

$$T_{P1} = \sum_{i=1}^{N} \sum_{k=1}^{W} x_{i,P1,k} * p_{i,P1}$$ Equation (7):

$$T_{P2} = \sum_{i=1}^{N} \sum_{k=1}^{W} x_{i,P2,k} * p_{i,P2}$$ Equation (8):

$$T_{P1NEW} = \sum_{i=1}^{N} \sum_{k=1}^{W} x_{i,P1,k} * p_{i,P1} + P_{D,P1} - P_{I,P1}$$ Equation (9):

$$T_{P2NEW} = \sum_{i=1}^{N} \sum_{k=1}^{W} x_{i,P2,k} * p_{i,P2} + P_{I,P2} - P_{D,P2}$$ Equation (10):

$$\max(T_{P1NEW}, T_{P2NEW}) < \max(T_{P1}, T_{P2})$$ Equation (11):

In the above equations the example of rearrangement (swap) of the table 'I' execution from P1 to P2 processor and table 'D' execution from P2 to P1 processor is validated along with preserving the table dependency; $p_{D,P1}$ represents the time consumed (e.g., transformation of business data) by table 'D' on P1 processor; $p_{I,P1}$ represents the time consumed (e.g., transformation of business data) by table 'I' on P1 processor; $p_{D,P2}$ represents the time consumed (e.g., transformation of business data) by table D on P2 processor; $p_{I,P2}$ represents the time consumed (e.g., transformation of business data) by table 'D' on P2 processor; $x_{i,P2,k}$ represents $i^{th}$ Table decision variable assigned to P2 processor in the $k^{th}$ time window; $p_{i,P2}$ represents the execution of time of $i^{th}$ Table in P2 processor; $x_{i,P1,k}$ represents $i^{th}$ Table decision variable assigned to P1 processor in $k^{th}$ time window; $p_{i,P1}$ represents the execution time of $i^{th}$ Table on P1 processor. $T_{P1}$ represents the total time of execution of all Tables currently scheduled on P1 processor; $T_{P2}$ represents the total time of execution of all Tables currently scheduled on P2 processor; $T_{P1NEW}$ & $T_{P2NEW}$ represents the new total time after rearrangement (swap) on P1 & P2 processor respectively; Equation (11) validates the rearrangement of tables (e.g., with table dependency constraints) for local optimization which may further optimize the transformation of the business data.

In an embodiment, execution of the local optimization algorithm may be exited or terminated by enforcing constraints. For instance, the execution of local optimization algorithm may terminate execution after an elapse of a certain time (e.g., predetermined time in seconds or minutes) or after determination that rearrangement of tables between the processors for transforming the business data may not be optimal, etc. Upon such determination, the execution of the local optimization algorithm may be terminated.

Estimating Execution Time for Transforming Business Data

In an embodiment, the execution of above discussed algorithms (e.g., decreasing time algorithm, critical path algorithm, etc.) may optimize the transformation of business data when historical or estimated execution time for transforming the business data exists. The execution time for transforming the business data may be determined or generated by executing test runs. The execution of test runs may generate execution time for transforming the business data and may represent historical information. For example, the historical information may include time consumed for transforming the business data under various test conditions or environments. Under such circumstances, estimated execution time may be computed based on estimating time, such as pessimistic time estimate, optimistic time estimate, normal time estimate etc.

In an embodiment, a pessimistic time estimate may correspond to a maximum time consumed for transforming the business data in a table; an optimistic time estimate may correspond to a minimum time consumed for transforming the business data in the table; and a normal time estimate may correspond an average time consumed for transforming the business data in the table. Based on the above estimating time, the estimated execution time may be computed by the equation:

$$D = \frac{P + 4M + O}{6}$$ Equation (12)

In Equation (12), 'P' represents the pessimistic time estimate; 'M' represents the normal time estimate and 'O' represents the optimistic time estimate; 'D' represents the estimated execution time for transforming the business data. In an embodiment, the estimated execution time for transforming the business data may be generated by number of records in the table when historical execution time are not available. For example, the estimated execution time, which may depend on the number of entries or records in the table, may be computed by equation:

$$T = R * U$$ Equation (13):

In Equation (13), 'T' represents the estimated execution time; 'R' represents the number of records or entries in the table; 'U' represents a constant (e.g., a real number) in time unit (e.g., U=0.1 ms). 'U may be computed based on the system configuration (e.g., CPU's processing speed, 1.6 GHz Vs 2 GHz, and RAM in processor etc.) when a standard number of records or entries in the table (e.g., millions or billions) are considered.

Estimation Algorithm

In an embodiment, an estimation algorithm may be executed when the historical execution time for transforming the business data does not exist or unavailable. When historical information of execution time is unavailable, the estimation algorithm may generate the estimated execution time based on number of records or entries stored in the table as explained in equation 13. In an embodiment, a database management system may assimilate number of records or entries of each table and store such statistical information in a storage associated with the database management system. The database management system may periodically scan the tables, determine modifications (e.g., add, delete, update, etc.) in number of entries in the tables and dynamically update such statistical information.

In an embodiment, based on the dependencies between the tables, the execution of transformation of business data in the tables may be scheduled by the scheduler. For example, the scheduler may schedule the transformation of business data in a sequence. In an embodiment, the sequence in which the transformation of business data in the tables, may be dynamically modified. For example, the sequence in which the business data in the tables may be transformed may depend on the priority list including the time schedules for transforming the business data. For example, let the priority list include tables (e.g., sequence in which the business data in the tables is transformed) as A, B, C, D, E, F, G, H, I, etc. Upon dynamically modifying the priority list, the priority list may include tables as A, B, C, E, F, G, H, I, J, D, etc. In an embodiment, the priority list may be sorted (e.g., in ascending order or descending order) and the execution of transformation of business data may be scheduled, such that the overall time for transforming the business data is optimized.

In an embodiment, the transformation of business data in the tables may be interrupted or terminated on account of a system reset or system failure. For example, let the scheduler schedules transforming the business data in the tables based on the above dynamically modified priority list (e.g., A, B, C, E, F, G, H, I, J, D, etc.) and while transforming the business data in one of the tables (e.g., F), the system is interrupted. Upon detection of such interruption, the scheduler may reschedule the execution of transformation of business data. In such a scenario, the scheduler may determine that the transformation of business data in the remaining tables (e.g., G, H, I, J, D, etc.) was interrupted. The scheduler may reschedule the transformation of business data for the remaining tables (e.g., G, H, I, J, D, etc.), and once the transformation of business data in the remaining tables is completed, the transformation of business data in Table F may be rescheduled. Hence the transformation of business data may be optimized, thereby reducing the overall time consumed for the transformation.

In an embodiment, transforming the business data by executing the above discussed algorithms (e.g., decrease time algorithm, critical path algorithm, local optimization algorithm, etc.), not only optimizes the transformation of business data, but also reduces the overall time consumed for executing a data transformation project. In an embodiment, the cost, systems, framework and the infrastructure for executing data transformation projects may also be optimized. For example, mechanisms discussed above (e.g., rescheduling, optimizing transformation, etc.) may reduce the operating cost (e.g., need for hiring experts for planning and execution of scheduling the transformation of business data, inefficient utilization of system resources and infrastructure for transformation of business data, etc.) for data transformation projects.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a tangible computer readable storage medium. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs. DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 10:
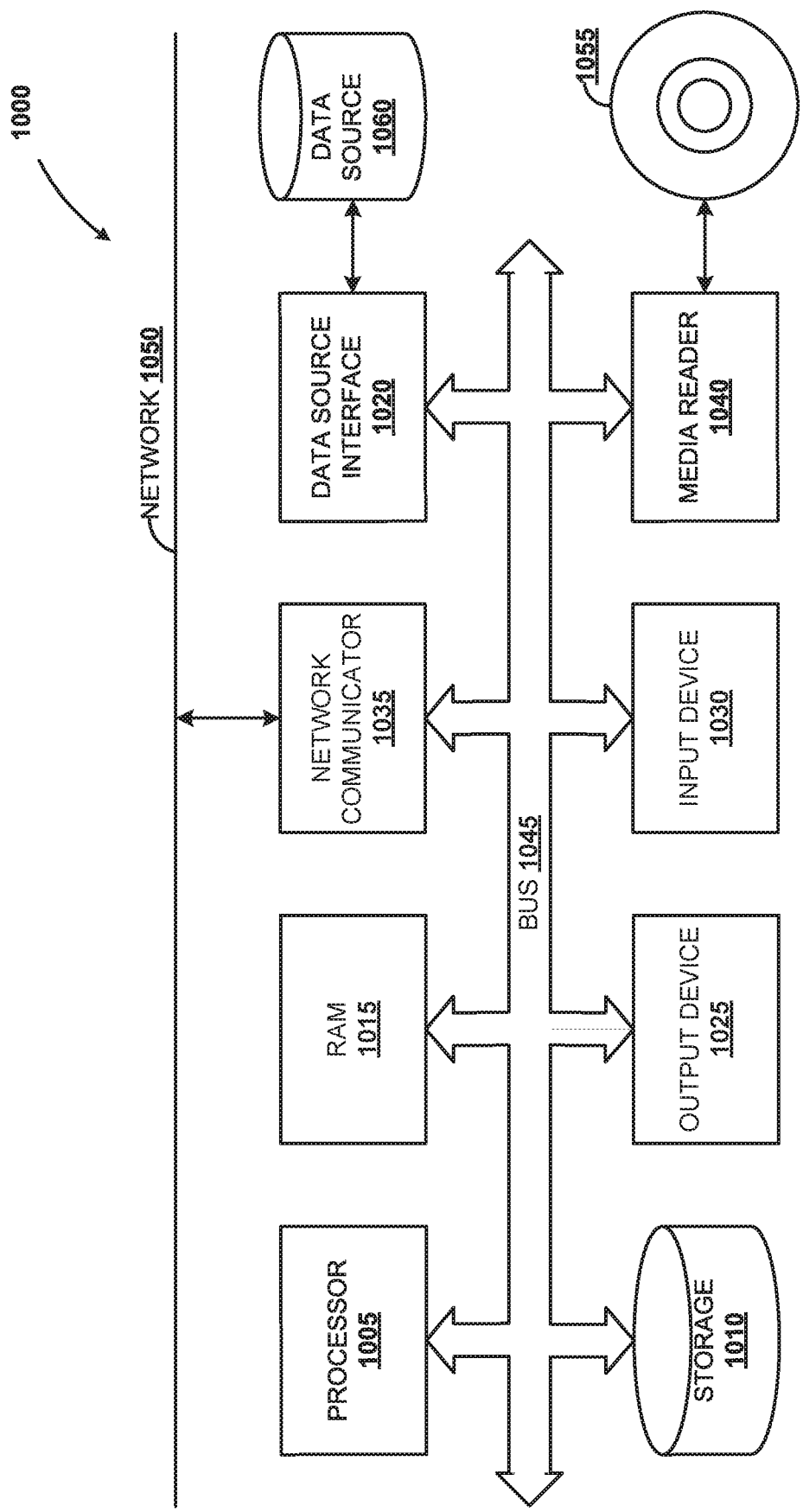
FIG. 10 is a block diagram of a computer system, according to an embodiment.

FIG. 10 is a block diagram of an exemplary computer system 1000, according to an embodiment. Computer system 1000 includes processor 1005 that executes software instructions or code stored on computer readable storage medium 1055 to perform the above-illustrated methods. For example, software instructions or code stored on computer readable storage medium 1055 may correspond to the optimization algorithms, estimation algorithms, generate an optimum execution schedule, calculating processor idle times during the transformation of business data, determining whether to rearrange the transformation of business data in the tables between the processors, etc. Processor 1005 can include a plurality of cores. Computer system 1000 includes media reader 1040 to read the instructions from computer readable storage medium 1055 and store the instructions in storage 1010 or in random access memory (RAM) 1015. Storage 1010 provides a large space for keeping static data where at least some instructions could be stored for later execution. According to some embodiments, such as some in-memory computing system embodiments, RAM 1015 can have sufficient storage capacity to store much of the data required for processing in RAM 1015 instead of in storage 1010. In some embodiments, all of the data required for processing may be stored in RAM 1015. The stored instructions may be further compiled to generate other representations of the instructions and dynamically stored in RAM 1015. Processor 1005 reads instructions from RAM 1015 and performs actions as instructed. According to one embodiment, computer system 1000 further includes output device 1025 (e.g., a display) to provide at least some of the results of the execution as output including, but not limited to, visual information to users and input device 1030 to provide a user or another device with means for entering data and/or otherwise interact with computer system 1000. Each of these output devices 1025 and input devices 1030 could be joined by one or more additional peripherals to further expand the capabilities of computer system 1000. Network communicator 1035 may be provided to connect computer system 1000 to network 1050 and in turn to other devices connected to network 1050 including other clients, servers, data stores, and interfaces, for instance. The modules of computer system 1000 are interconnected via bus 1045. Computer system 1000 includes a data source interface 1020 to access data source 1060. Data source 1060 can be accessed via one or more abstraction layers implemented in hardware or software. For example, data source 1060 may be accessed by network 1050. In some embodiments data source 1060 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to generate an execution schedule to optimize transformation of business data, comprising:
    from a plurality of tables residing in a plurality of databases and storing business data associated with a plurality of business management systems, determining dependencies between one or more tables from the plurality of tables based on attributes associated with the plurality of tables, wherein the transformation of the business data includes modification of the business data in order to unify the data between the plurality of business management systems;
    determining that a historical execution time exists, wherein the historical execution time is based on an executed test run that corresponds to simulated or actual operating conditions;
    based on determining that the historical execution time for the transformation of the business data does not exist, executing an estimation algorithm to generate an estimated execution time for the transformation of the business data in a test environment;
    based on execution times including the historical execution time or the estimated execution time for transforming the business data in the one or more tables, executing one of a decrease time algorithm or a critical path algorithm to generate an execution schedule and calculate one or more processor idle times for the transformation of the business data in the one or more tables, wherein the decrease time algorithm sorts, in descending order, the execution times and upon sorting the execution times, the execution schedule is generated that preserves the determined dependencies between the tables;
    based on the calculated one or more processor idle times:
        determining whether or not to execute a local optimization algorithm; and
        based on the determining whether or not to execute the local optimization algorithm, modifying the generated execution schedule for the transformation of the business data; and
    executing the transformation of the business data based on the generated execution schedule that optimizes a time consumed for the transformation of the business data in the one or more tables.

2. The computer implemented method of claim 1, further comprising: when the estimation algorithm is executed:
    determining number of records in the one or more tables;
    determining the execution times of one or more records by executing a test run on the one or more tables for transforming the business data; and
    dynamically modifying the generated estimated execution times to optimize a time consumed for transforming the business data.

3. The computer implemented method of claim 1, further comprising:
    when the decrease time algorithm is executed:
    upon determining the existence of the execution times, sorting the execution times in a descending order; and
    based on the sorted execution times, rearranging the one or more tables between the one or more processors to generate the execution schedule for transforming the business data.

4. The computer implemented method of claim 1, further comprising:
    when the critical path algorithm is executed:
    upon generating a precedence graph for the one or more tables based on the determined dependencies between the one or more tables:
    from the precedence graph, computing one or more critical paths between the one or more tables based on a descending order of the execution times associated with one or more tables for the transformation of the business data; and
    based on the computed critical paths, generating a priority list including the execution schedule for transformation of the business data.

5. The computer implemented method of claim 1, further comprising: when the local optimization algorithm is executed:
    determining the one or more processor idle times in the one or more processors; and based on the determined one or more processor idle times and the one or more dependencies between the one or more tables, determining whether or not to rearrange the one or more tables between the one or more processors for transforming the business data.

6. The computer implemented method of claim 1, wherein the execution of local optimization algorithm is terminated after an elapse in predetermined time.

7. A computer system to generate an execution schedule to optimize transformation of business data, comprising:
a memory storing computer instructions; and
a processor communicatively coupled with the memory to execute the instructions to perform operations comprising:
from a plurality of tables residing in a plurality of databases and storing business data associated with a plurality of business management systems, determining one or more dependencies between one or more tables from the plurality of tables based on attributes associated with the plurality of tables, wherein the transformation of the business data includes modification of the business data in order to unify the data between the plurality of business management systems;
determining that a historical execution time exists, wherein the historical execution time is based on an executed test run that corresponds to simulated or actual operating conditions;
based on determining that the historical execution time for the transformation of the business data does not exist, executing an estimation algorithm to generate an estimated execution time for the transformation of the business data in a test environment;
based on execution times including the historical execution time or the estimated execution time for transforming the business data in the one or more tables, executing one of a decrease time algorithm or a critical path algorithm, to generate an execution schedule and calculate one or more processor idle times for the transformation of the business data in the one or more tables, wherein the decrease time algorithm sorts, in descending order, the execution times and upon sorting the execution times, the execution schedule is generated that preserves the determined dependencies between the tables;
based on the calculated one or more processor idle times:
determining whether or not to execute a local optimization algorithm; and
based on the determining whether or not to execute the local optimization algorithm, modifying the generated execution schedule for the transformation of the business data; and
executing the transformation of the business data based on the generated execution schedule that optimizes a time consumed for the transformation of the business data in the one or more tables.

8. The computer system of claim 7, further comprising: when the estimation algorithm is executed:
determine number of records in the one or more tables;
determine the execution times of one or more records by executing a test run on the one or more tables for transforming the business data; and
dynamically modifying the generated one or more estimated execution times to optimize a time consumed for transforming the business data.

9. The computer system of claim 7, further comprising: when the decrease time algorithm is executed:
upon determining the existence of the execution times, sorting the execution times in a descending order; and
based on the sorted execution times, rearranging the one or more tables between the one or more processors to generate the execution schedule for transforming the business data.

10. The computer system of claim 7, further comprising: when the critical path algorithm is executed:
upon generating a precedence graph for the one or more tables based on the determined dependencies between the one or more tables:
from the precedence graph, computing one or more critical paths between the one or more tables based on a descending order of the execution times associated with one or more tables for the transformation of the business data; and
based on the computed critical paths, generating a priority list including the execution schedule for transformation of the business data.

11. The computer system of claim 7, further comprising: when the local optimization algorithm is executed:
determining the one or more processor idle times in the one or more processors; and
based on the determined one or more processor idle times and the dependencies between the one or more tables, determining whether or not to rearrange the one or more tables between the one or more processors for transforming the business data.

12. The computer system of claim 7, wherein the execution of local optimization algorithm is terminated after an elapse in predetermined time.

13. A non-transitory computer readable storage medium tangibly storing instructions, which when executed by a computer, cause the computer to execute operations comprising:
from a plurality of tables residing in a plurality of databases and storing business data associated with a plurality of business management systems, determine dependencies between one or more tables from the plurality of tables based on attributes associated with the plurality of tables, wherein the transformation of the business data includes modification of the business data in order to unify the data between the plurality of business management systems;
determining that a historical execution time exists, wherein the historical execution time is based on an executed test run that corresponds to simulated or actual operating conditions;
based on determining that the historical execution time for the transformation of the business data does not exist, executing an estimation algorithm to generate an estimated execution time for the transformation of the business data in a test environment;
based on execution times including the historical execution time or the estimated execution time for transforming the business data in the one or more tables, execute one of a decrease time algorithm or a critical path algorithm to generate an execution schedule and calculate one or more processor idle times for the transformation of the business data in the one or more tables, wherein the decrease time algorithm sorts, in descending order, the execution times and upon sorting the execution times, the execution schedule is generated that preserves the determined dependencies between the tables;

based on the calculated one or more processor idle times:
  determining whether or not to execute a local optimization algorithm; and
  based on the determining whether or not to execute the local optimization algorithm, modifying the generated execution schedule for the transformation of the business data; and
execute the transformation of the business data based on the generated execution schedule that optimizes a time consumed for the transformation of the business data in the one or more tables.

14. The non-transitory computer readable storage medium of claim 13, further comprising: when the estimation algorithm is executed:
  determine number of records in the one or more tables;
  determine the execution times of one or more records by executing a test run on the one or more tables for transforming the business data; and
  dynamically modifying the generated estimated execution times to optimize a time consumed for transforming the business data.

15. The non-transitory computer readable storage medium of claim 14, further comprising: when the decrease time algorithm is executed:
  upon determining the existence of the execution times, sorting the execution times in a descending order; and
  based on the sorted execution times, rearranging the one or more tables between the one or more processors to generate the execution schedule for transforming the business data.

16. The non-transitory computer readable storage medium of claim 13, further comprising: when the critical path algorithm is executed:
  upon generating a precedence graph for the one or more tables based on the determined dependencies between the one or more tables:
  from the precedence graph, computing one or more critical paths between the one or more tables based on a descending order of the one or more execution times associated with one or more tables for the transformation of the business data; and
  based on the computed critical paths, generating a priority list to including the execution schedule for transformation of the business data.

17. The non-transitory computer readable storage medium of claim 13, further comprising: when the local optimization algorithm is executed:
  determining the one or more processor idle times in the one or more processors; and
  based on the determined one or more processor idle times and the dependencies between the one or more tables, determining whether or not to rearrange the one or more tables between the one or more processors for transforming the business data.

* * * * *